United States Patent [19]

Urquiola

[11] Patent Number: 5,516,865
[45] Date of Patent: May 14, 1996

[54] WATERBORNE (METH) ACRYLIC LATEX POLYMERS FOR RELEASE

[75] Inventor: Maria B. Urquiola, Inver Grove Heights, Minn.

[73] Assignee: Minnesota Mining and Manufacturing Company, St. Paul, Minn.

[21] Appl. No.: 382,900

[22] Filed: Feb. 3, 1995

[51] Int. Cl.$^6$ ............................. C08F 120/18; C08F 2/16
[52] U.S. Cl. .................................. 526/329.7; 526/329.3; 526/328.5; 524/556; 524/560; 524/561; 524/565; 524/458; 524/460; 524/461
[58] Field of Search ...................... 524/561, 458, 524/460, 461, 556, 560, 565; 526/328.5, 329.3, 329.7

[56] References Cited

U.S. PATENT DOCUMENTS

| | | | |
|---|---|---|---|
| 3,011,988 | 12/1961 | Leudke et al. | 260/29.6 |
| 3,876,596 | 4/1975 | Grubert et al. | 260/39.5 |
| 3,915,921 | 10/1975 | Schlatzer, Jr. | 524/916 |
| 3,970,126 | 9/1969 | Sermakas et al. | 526/318.99 |
| 4,299,741 | 11/1981 | Doehnert | 260/17.4 |
| 4,495,233 | 1/1985 | Bassetti | 428/81 |
| 4,762,946 | 8/1988 | Ritter et al. | 560/179 |
| 4,814,373 | 3/1989 | Frankel et al. | 524/460 |
| 4,906,702 | 3/1990 | Ritter et al. | 526/321 |
| 5,093,414 | 3/1992 | Rauterkus et al. | 524/813 |
| 5,225,480 | 7/1993 | Tseng et al. | 524/813 |
| 5,350,631 | 9/1994 | Tseng et al. | 428/343 |
| 5,369,163 | 11/1994 | Chiou et al. | 524/458 |

FOREIGN PATENT DOCUMENTS

| | | |
|---|---|---|
| 448399 A2 | 9/1991 | European Pat. Off. |
| 859739 | 1/1961 | United Kingdom . |
| 870022 | 6/1961 | United Kingdom . |

OTHER PUBLICATIONS

Colloidal Systems and Interfaces, Ross et al., "Emulsions", John Wiley & Sons, pp. 290–293 Future Directions in Polymer Colloids, "Monomer Distribution and Transport in Miniemulsion Copolymerization", Delgado et al., p. 79.
Polymer Latexes, "Preparation, Characterization, and Applications", Tang et al., American Chemical Society, 1992, pp. 72–98.

*Primary Examiner*—Paul R. Michl
*Assistant Examiner*—Olga Asinovsky
*Attorney, Agent, or Firm*—Gary L. Griswold; Walter N. Kirn; Carolyn V. Peters

[57] ABSTRACT

A waterborne latex polymer composition having latex particles comprising (1) about 25 to about 75 weight percent of a first monomer, wherein the first monomer is at least one free-radically polymerizable long chain alkyl (meth)acrylate monomer; (2) about 75 to about 25 wt % of a second monomer, wherein the second monomer is a short alkyl chain (meth)acrylate monomer, wherein the alkyl group contains less than about 12 carbon atoms and the second monomer may be a mixture comprising; i) none, one or more (meth)acrylic acid monomers; ii) none, one or more vinyl nitrile monomers; and iii) none, one or more (meth)acrylic ester monomers, with the provisio that the second monomer mixture comprises at least one of (meth)acrylic acid monomer, vinyl nitrile monomer, and (meth)acrylic ester monomer and a method of making the latex particles.

13 Claims, No Drawings

WATERBORNE (METH) ACRYLIC LATEX POLYMERS FOR RELEASE

TECHNICAL FIELD

This invention relates to (meth)acrylic latex polymers and in particular to (meth)acrylic latex polymers prepared by emulsion polymerization and useful as release coatings. This invention further relates to a method for the preparation of the (meth)acrylic latex polymers.

BACKGROUND OF THE INVENTION

Generally, conventional release coating compositions are solvent-based polymers. They are typically prepared using solution polymerization in organic solvents. In an attempt to meet many environmentally driven standards to reduce or replace volatile organic solvents, efforts have been directed towards the development of waterborne release coatings and low adhesion backsize coatings. Furthermore, reducing and/or eliminating solvents has added economical advantage. However, the aqueous release coatings described in the literature are not completely solvent-free systems. Many of the existing waterborne release coatings involve processes where solvents are used during the polymerization. These processes then require an additional step of distillation or other process(es) to remove the solvents.

For examples, release agents can include vinyl acetate-stearyl maleate copolymers and octadecyl acrylate-acrylic acid copolymers. Such release agents are prepared by mixing the copolymers, which are prepared and contained within organic solvents, with isopropanol, water, and morpholine followed by distillation in order to remove the organic solvents.

In another example, a low adhesion backsize is described comprising a polymer of octadecyl acrylate, (meth)acrylic acid, (meth)acrylonitrile, and methyl (meth)acrylate and is obtained by the polymerization of the monomers in one or more organic solvents. This polymer solution can then be converted into an aqueous dispersion. The method involves the addition of water and morpholine to an organic solvent solution of the polymer followed by the removal of the organic solvent by distillation.

In yet another process, a release polymer is obtained by polymerizing a higher alkyl (meth)acrylate ester monomer (stearyl methacrylate is preferred), a carboxyl supplying monomer, and an (meth)acrylate derived hardening monomer in an organic solvent. The aqueous backsize composition is prepared by adding a base to a solution of the terpolymer in an organic solvent, followed by the addition of a thickener and an aqueous solvent mixture.

As indicated, the use of solvents is not desirable due to environmental, economic, and safety reasons.

Attempts have been made at preparing aqueous-based dispersions of long alkyl chain branched polymers by the emulsion polymerization of monomer systems comprising long alkyl chain vinyl monomers such as octadecyl acrylate, stearyl methacrylate, vinyl stearate, etc. However, because of the relatively low water solubility of these long chain monomers as compared to short alkyl chain vinyl monomers in aqueous systems, difficulties have been encountered in attempting to incorporate these long alkyl chain vinyl monomers into a polymer structure. This problem is significantly augmented when the short alkyl chain vinyl monomers are soluble in water. Thus, the polymer dispersions or emulsions prepared via such methods do not provide desirable release levels and stable release upon aging.

To overcome the difficulties encountered in attempting to incorporate long alkyl chain vinyl monomers, alternative processes have been attempted wherein a waterborne low adhesion backsize latex comprising polymerized free radically polymerizable monomers of the formula $C_nH_{2n+1}$—P—$C_mH_{2m}$—X—CR'=$CH_2$, wherein n is an integer of about 12 to about 20, P is a divalent linking group, X is either —OCO— or —NHCO—, m is an integer of about 2 to about 10 and R' is —H or —$CH_3$. The latices are prepared according to a batch polymerization. Although the latices are waterborne, release values increase significantly after aging, thus indicating less than desirable aging characteristics.

Thus, there is a need to provide water-borne release coatings that are essentially solvent free, while at the same time providing desirable release and aging characteristics.

SUMMARY OF THE INVENTION

Briefly, in one aspect of the present invention, polymer latices are provided that are useful as low adhesion backsizes (LAB) for pressure-sensitive adhesive (PSA) tapes. In another aspect, a polymerization process for preparing latices of the present invention is provided. In yet another aspect, coated articles comprising a layer of the polymer latex compositions of the present invention are provided.

With the ever present environmental concern to eliminate organic solvents, the use of 100% solids and water-based release coatings is becoming more desirable. The latices of the present invention are water-borne, which is an advantage over the more conventional release coating compositions that are usually comprised of solvent-based polymers, and possess good and stable release characteristics.

The polymer latices of the present invention comprise:

(a) latex particles, wherein the latex particles are the polymerization reaction product comprising:

(1) about 25 to about 75 weight percent of a first monomer, wherein the first monomer is at least one free-radically polymerizable long chain alkyl (meth)acrylate monomer;

(2) about 75 to about 25 wt % of a second monomer, wherein the second monomer is a short alkyl chain (meth)acrylate monomer, wherein the alkyl group contains less than about 12 carbon atoms and the second monomer may be a mixture comprising:
  i) none, one or more (meth)acrylic acid monomers;
  ii) none, one or more vinyl nitrile monomers; and
  iii) none, one or more (meth)acrylic ester monomers, with the proviso that the second monomer mixture comprises at least one (meth)acrylic acid monomer, vinyl nitrile monomer, and (meth)acrylic ester monomer;

(b) an effective amount of emulsifier;

(c) water; and (d) additives.

Additives for the above-identified compositions can included fillers, coalescing agents, defoamers, and the like.

In the above water-borne latex polymer compositions, the particles are the polymerization product of several monomers. The term "first monomer," and the like is taken to mean that this component could be a mixture of several like monomers. For example, the "second monomer" could be an acrylic acid, a methacrylic acid or a combination of the two monomers.

The present invention also provides a method for preparing the latices. In the present invention, a novel two-step emulsion polymerization is used. In the first stage, a vessel is charged with water, emulsifier mixture, at least one long alkyl chain monomer, and optionally a short chain monomer (wherein the short alkyl chain monomer is substantially water insoluble) and is stirred and heated until the long chain monomer is melted and dispersed. The resultant mixture is then adequately homogenized, wherein the adequacy of homogenization is typically determined by droplet size, for example droplets having a diameter in the range of 0.1 to 0.4 µm, typically indicate that the dispersion is adequately homogenized. The emulsion (that is, the homogenized dispersion) thus obtained is then charged into the reactor together with an initiator and polymerization is initiated. Although it is preferred to charge the initiator after the first mixture has been homogenized, it is also possible to add the initiator before, during, after or at any step prior to initiation, provided the initiator is not sufficiently activated to commence polymerization of the first stage monomers until such first stage monomers have been homogenized.

Second stage monomers comprising short alkyl chain monomers including water soluble and insoluble monomers are then added to the stirred reactor over a given period of time and allowed to polymerize. Typically addition times range upwards to about 2 hours or more. Flow rates are generally adjusted to accommodate such a charge time. The latices obtained from this process comprise particles having diameters in the range of about 0.1 to about 0.5 µm.

In another aspect of the present invention, a coated sheet material is provided comprising a flexible sheeting and a release coating covering at least a portion of one major surface of the flexible sheet wherein the release coating is formed by coating the above-described water-borne (meth)acrylic latex polymer, which has been diluted as necessary for coating. The coated article thus obtained possesses excellent release and aging properties.

The latices of the present invention provide release during unwinding of pressure sensitive adhesive coated tapes, such as clear tapes, masking tape, packaging tape or release during the removal of adhesive coated paper.

Advantageously, the water-based latices of the present invention are prepared without the use of organic solvents. Release coatings and LABs obtained possess good release and aging properties for conventional pressure sensitive adhesives.

As used in this application:

"(meth)acrylic acid", "(meth)acrylate" or "(meth)acrylonitrile" means acrylic or methacrylic acid, ester or nitrile, respectively; when a compound is specifically acrylic or methacrylic acid or one of its derivatives, the correct full name is used, for example, acrylic acid and methacrylate.

DESCRIPTION OF THE PREFERRED EMBODIMENT(S)

Water-Borne LAB and Release Coating Composition

The latices of the present invention are comprised of a polymer dispersed within an aqueous phase that is stabilized with an emulsifier. The latices are prepared by emulsion polymerization or copolymerization of (meth)acrylic monomers, e.g., monomers of (meth)acrylic acid, their esters, nitriles, and the like. The latices provide release during unwinding of pressure sensitive adhesive coated tapes, and the like.

Long Chain Monomers

Long alkyl chain (meth)acrylates useful in forming the polymer latices of the present invention include (meth)acrylate-based monomers having a side alkyl chain containing from at least about 12 to about 24 carbon atoms in length. If it contains less than 12 carbon atoms, the alkyl chain does not crystallize at room temperature and it does not provide release properties. Acrylates possessing alkyl chain lengths of more than 24 carbon atoms are difficult to polymerize because the melting temperature is too high. Particularly, useful monomers include but are not limited to octadecyl acrylate, stearyl acrylate, and behenyl acrylate.

Short Chain Monomers

As indicated above, one or more short alkyl chain (meth)acrylate monomers, wherein the alkyl group contains less than about 12 carbon atoms, is polymerized with one or more long chain monomers. Useful monomers include but are not limited to those chosen from the group consisting of alkyl esters of acrylic and methacrylic acid, such as methyl acrylate, ethyl acrylate, isobornyl acrylate, hydroxyethyl acrylate, methyl methacrylate, ethyl methacrylate, etc.; vinyl nitriles such as acrylonitrile, methacrylonitrile, etc.; polymerizable acids such as acrylic acid, methacrylic acid, etc.; vinyl esters such as vinyl acetate, vinyl propionate, etc.; and mixtures thereof.

The polymers made in this invention comprise from about 25 to about 75% of the long alkyl chain monomer. Typically, compositions having more than 75% of the long alkyl chain monomer can lead to coatings that may be weak and brittle. Alternatively, when the content of the long alkyl chain monomer is lower than 25%, release properties of the final polymer are not optimal, although operable.

The combination of the short alkyl chain monomers is such that when polymerized with the long alkyl chain monomer, a polymer structure with good release and release values that are stable upon aging against PSAs, film forming ability (particles propensity to coalesce and form a film), and good surface adhesion of the polymer to a surface when coated thereon is provided. The latex particles contain from about 75 to 25 wt % of a short alkyl chain monomer. The preferred compositions contain more than one short alkyl chain monomer. Thus, the compositions comprise from about 0% to about 15% of an (meth)acrylic acid, from about 0% to about 30% of a vinyl nitrile, and from about 0 to about 40% of an (meth)acrylic ester, wherein the percentages of the individual short alkyl chain monomers represent the total weight percent of the latex particles and that the second monomer mixture comprises at least one of (meth)acrylic acid monomer, vinyl nitrile monomer, and (meth)acrylic ester monomer.

Emulsifiers

Emulsifiers (also referred to as "surfactants") useful in conventional emulsion polymerization, including the categories of anionic, nonionic, amphoteric, and cationic emulsifiers, may be used in the emulsion polymerization of the release coatings of the present invention.

Useful anionic emulsifiers include but are not limited to the following: sulfosuccinates and derivatives, alkylaryl sulfonates, olefin sulfonates, phosphate esters, sulfates and sulfonates of ethoxylated alkylphenols, sulfates and sulfonates of ethoxylated fatty alcohols, sulfates of fatty esters, and mixtures thereof.

Useful nonionic emulsifiers include but are not limited to the following: ethoxylated fatty alcohols, ethoxylated fatty esters, ethoxylated fatty acids, ethoxylated alkylphenols, ethylene oxide-propylene oxide block copolymers, and mixtures thereof.

Useful cationic emulsifiers include but are not limited to the following: long chain amines and their salts, quaternary ammonium salts, and mixtures thereof.

Useful amphoteric emulsifiers include but are not limited to the following: betaine derivatives, sulfobetaine derivatives, and mixtures thereof.

Polymerizable surfactants, that is, surfactants that possess a vinyl polymerizable group, may also be used. Useful polymerizable surfactants include but are not limited to TREM LF-40 from Henkel, Mazon SAM 211 from PPG Industries, and mixtures thereof Mixtures of polymerizable surfactants with conventional non-polymerizable surfactants may be also employed.

Polymeric stabilizers such as poly(vinyl alcohol), cellulosics such as hydroxyethyl cellulose, poly(acrylic acid) and so on may also be used alone or in combination with other emulsifiers.

The Hydrophilic-Lypophilic Balance (HLB) of a surfactant is an expression of the balance of the size and strength of the hydrophilic groups and the lypophilic groups of the surfactant. In general, the HLB value of each emulsifier can be used as a guide for choosing a proper emulsifier or emulsifier combination. Typically, an emulsifier possessing an HLB value greater than 8 is appropriate for preparing the emulsion latices of the present invention. However, this value should not be taken to limit the type of emulsifier used, provided the emulsifier or emulsifier combination functions as an emulsifier in the polymerization process. Furthermore, the emulsifier or mixture of emulsifiers are added to the emulsion in an amount sufficiently effective to function as an emulsifier.

Most preferably, the emulsion polymerization of this invention uses a mixture of an anionic and a nonionic emulsifier. A particularly useful range of emulsifier concentration is from about 0.5 to about 8 weight percent based on the total weight of all monomers.

Initiators

Initiators useful in the emulsion polymerization process of the present invention are well known to those skilled in the art and are described in Emulsion Polymerization, D.C. Blackley, 1975, Chap. 6, Applied Science Publishers, Ltd., London.

It is conventional to subdivide initiators into two broad classes: (a) dissociative initiators and (b) redox initiators. Preferably, the initiator selected is a water-soluble initiator, such as potassium or ammonium persulfate, hydrogen peroxide and 2,2'-azobis(2-amidoinopropane)dihydrochloride. Partially water-soluble peroxides such as succinic acid peroxide and t-butyl hydroperoxide and azo compounds such as 4,4'-azobis(4-cyanopentanoic acid) are also useful. Redox systems such as persulfate with ferrous ion are also commonly used. Redox systems are advantageous in yielding desirable initiation rates at temperatures below 50° C. Other useful redox systems include cumyl hydroperoxide or hydrogen peroxide with ferrous, sulfite or bisulfite ion.

Initiators are added to the emulsion in catalytically effective amounts to initiate polymerization and such amounts typically range from 0.05 to 1% based on the total weight of the monomers.

pH Buffers

Depending upon the monomer composition, the type of emulsifier, and the type of initiator selected, it may be desirable to maintain the pH of the emulsion polymerization system within a certain range. Useful pH buffers include sodium bicarbonate, sodium hydrogen phosphate, and the like.

Emulsion Polymerization Process

In the present invention, a novel two-stage emulsion polymerization process is used to prepare the low adhesion backsize. The polymers of this invention comprise long alkyl chain monomers. These monomers, due to their very low water solubility, present important challenges if they are to be incorporated into the synthesis of waterborne latices. In addition, the most preferred polymers of this invention also comprise short alkyl chain monomers that are highly soluble in water. The incorporation into the polymer of these water soluble monomers, in combination with the long alkyl chain monomers, presents further challenges due to their differences in solubility. A method for the preparation of latices as well as latex compositions are described.

In the present invention, a two-stage polymerization process is used. In the first stage a vessel is charged with water, surfactant mixture, the long alkyl chain monomer, and optionally a short chain monomer (substantially water insoluble) and is stirred and heated until the long alkyl chain monomer is melted and dispersed. The resultant mixture is then homogenized to form an emulsion. Typically, the emulsion thus obtained is a stable emulsion containing droplets of monomer or monomer mixture having a diameter on the order of about 0.1 to 0.5 micrometers dispersed within the aqueous phase. The stability of the emulsion prior to polymerization is sufficient to permit intermediate handling or processing. Homogenization can be accomplished using conventional homogenizers such as a Waring™ blender (available from Dynamics Corporation of America), a Manton-Gaulin™ homogenizer (available from Gaulin Corporation), a Microfluidizer™ homogenizer (available from Microfluidics Corporation), a colloid mill, a Sonifier™ homogenizer (available from Bronson Ultrasonics Corporation), a rotor-stator type homogenizer, etc.

Although it is preferred to charge the initiator after the first mixture has been homogenized, it is also possible to add the initiator before, during, after or at any step prior to initiation, provided the initiator is not sufficiently activated to commence polymerization of the first stage monomers until such first stage monomers have been homogenized.

The emulsion is then charged in the reactor together with the initiator, stirred and heated to 60° C. under a nitrogen blanket. The second stage monomers comprising short alkyl chain monomers including both substantially water soluble and substantially water insoluble monomers are then added to the stirred reactor over a period of time typically ranging upwards to about 2 hours, while the reaction temperature is maintained at 80° C. Preferably, the addition of the second stage monomers is started after allowing the first stage monomers to polymerize to about 0 to about 40%. After about 4 to about 12 hours of additional heating, the latex is collected. Generally, the emulsion is heated until monomer conversion is greater than 90%. The latex thus obtained comprises polymer particles having diameters in the order of about 0.1 to about 0.5 micrometers.

This polymerization process allows to overcome several difficult factors. It includes two steps:

1. Homogenization. While not intending to be bound by theory, it is believed this homogenization step is conducted to improve the reactivity of the long alkyl chain monomers. Reactivity increases by increasing the surface area of the long alkyl chain monomer droplets. The probability of a radical to encounter the monomer increases and, thus, the reactivity of the monomer also increases. In the initial stage of an emulsion polymerization, the monomer is mainly distributed between monomer droplets and much smaller surfactant micelles. When a water-soluble initiator is added to the aqueous phase, radicals are generated. The radicals will be absorbed into the micelles or into the droplets to form the polymer particles, the main polymerization loci. Although most of the monomer is in the droplets, there are many more micelles that offer a much larger surface area. Thus, the radicals are mainly absorbed in the micelles, where polymerization can then proceed. Therefore, for the polymerization to take place, the monomer diffuses from the monomer droplets into the polymer particles through the aqueous phase. The long alkyl chain monomers, one of the components in providing the release characteristics of the LAB, have a very low water solubility and do not readily diffuse through the aqueous phase. As a result, most of these monomers remain in the monomer droplets and do not polymerize. In order to facilitate the polymerization of these long alkyl chain monomers, a homogenization step is carried out prior to the polymerization. During the homogenization the size of the monomer droplets is significantly reduced, allowing them to compete with the micelles for radical absorption. In this way the long alkyl chain monomers do not have to diffuse through the aqueous phase in order to polymerize.

2. The short alkyl chain monomers with high water solubility are added into the reactor after the homogenization of the long alkyl chain monomers. Their addition into the reactor after homogenization of the first stage monomers improves their incorporation (copolymerization) into the polymer particles and diminishes the homopolymerization in the aqueous phase.

Other Additives

The latex prepared according to the method of the invention may be used alone as a release coating or alternatively various additives well known in the art such as pH modifiers, coalescing agents, rheology modifiers, and defoamers, may be added. pH modifiers, such as ammonium hydroxide, sodium hydroxide, and so on may be use to adjust the pH of the latex depending on the application. Coalescing agents may be admixed with the latex in order to ensure adequate coverage of a coating thereof onto a substrate. Useful coalescing agents include but are not limited to N-methyl pyrrolidone, the Carbitol™ series of poly(ethylene glycol) alkyl ethers (available from Union Carbide), and mixtures thereof. Poly(ethylene glycol) at different molecular weights can be also added. Rheology modifiers may be added as well to improve the rheological properties of the latex. Useful rheology modifiers include but are not limited to Kelzan® series (available from Kelco), hydroxyethyl cellulose, UCAR® Polyphobe series (available from Union Carbide), and mixtures thereof. Defoamers can also be added in the applications in which foam is generated. Useful defoamers include but are not limited to: Surfynol® series (available from Air Products), Antifoam H-10 Emulsion (available from Dow Corning), and mixtures thereof.

Coated Sheet Materials

The latices of the present invention are typically best used as a coating for a solid substrate, such as a sheet, a fiber or a shaped object. However, the preferred substrates are those that are typically used for pressure-sensitive adhesive products. Such substrates include but are not limited to paper, metal sheets and foils, nonwoven fabrics, cellophane, films of thermoplastic resins such as polyesters, polyamides, polyolefins, polycarbonates, polyvinyl chloride, and acetate films. Primers known in the art can be used to aid in the adhesion of the latex coating to the substrate, although this is not necessary.

The desired concentration of the latex coating depends upon the method of coating, and the desired coating thickness. The latex composition can be diluted with water to a lower concentration, for example about 2 to about 20 wt. % solids.

The coating composition may be applied to a suitable substrate by means of conventional coating techniques such as wire-wound rod, direct gravure, offset gravure, reverse roll, air-knife and trailing blade coating. The coating is typically dried at a temperature of at least about 5° C. above the highest melting point of the latex polymer. The resultant coatings provide effective release for a wide variety of conventional pressure-sensitive adhesives, such as natural rubber-based, acrylic and other synthetic elastomeric materials. Although the polymer latex composition of the present invention can provide a release force from about 10 g/cm to a high release force, for example 500 g/cm, typically release forces for a medium release are about 10 to about 200 g/cm against aggressive pressure sensitive adhesives.

The present invention provides a roll of tape that includes a flexible backing member, a pressure-sensitive adhesive coating on one major surface of the backing member and a release coating on the opposite major surface of the backing comprising the water-borne acrylic latex polymer of the present invention.

This invention also provides a coated sheet material wherein the release coating is on one side of the sheet and the adhesive is on the other side. The invention further provides a coated sheet material wherein the adhesive is a normally tacky and pressure sensitive adhesive, for example, cured hot melts, tacky pressure sensitive adhesives, postcurable adhesives, and B-stage adhesives and coatings. The invention also provides a stack of superimposed sheets of coated sheet material, the pressure sensitive adhesive on each sheet being in contact with the release coating on an immediately adjacent sheet.

The invention also provides a fanfolded web formed from the coated sheet material, the adhesive on each segment of the web being in contact with the release coating on an immediately adjacent segment. The invention also provides the coated sheet material wherein the adhesive is present in a band adjacent to one edge of the sheet.

This invention also provides for clear tapes, masking tapes, packaging tapes, adhesive-coated papers, and the like. The invention also provides for any article wherein normally tacky, pressure sensitive adhesive is coated onto a backing or substrate and is in contact with the release coating on an immediately adjacent sheet or surface, such as a roll of tape.

The following examples illustrate the practice of the present invention but should not be construed as limiting its scope.

The objects, features and advantages of the present invention are further illustrated by the following examples, but the particular materials and amounts thereof recited in these examples, as well as other conditions and details, should not be construed to unduly limit this invention. All materials are commercially available or known to those skilled in the art unless otherwise stated or apparent. All parts and percentages in the Examples and the Specification are by weight, unless otherwise specified.

EXAMPLES

Example 1

In a flask 77% deionized water, 12.5% Octadecyl acrylate monomer, 3.24% methyl acrylate monomer, 0.31% Siponate™ DS-10 surfactant (sodium dodecyl benzene sulfonate, available from Rhone-Poulenc), 0.28% Igepal™ CA- 897 surfactant (octylphenoxypoly(ethyleneoxy)ethanol, from Rhone-Poulenc), and 0.054% sodium bicarbonate were heated to 50° C. under agitation. The mixture was homogenized in a Waring™ Blender for 3 minutes. The resulting emulsion was placed under nitrogen in a glass flask equipped with a thermometer, metering pump, mechanical stirrer, and reflux condenser. The mixture was heated to 60° C. and 0.087 parts potassium persulfate initiator was added. 30 minutes after reaching 60° C. the temperature was raised to 80° C. while a mixture of 1.11% methyl acrylate, 3.18% acrylonitrile, and 0.66% acrylic acid was pumped into the reactor over a forty minute period. The reaction mixture was kept at 80° C. with agitation for six hours. A stable latex was obtained. The latex was then evaluated as a waterborne LAB according to the following procedure. A small portion of the latex was applied onto cellulose acetate film using a #3 Meyer bar. The coated cellulose acetate film was dried at 75° C. for two minutes. After the coated film was cooled to room temperature, a 1.27 cm inch wide strip of #810 Magic™ tape (available from 3M Company) was applied onto the coated film. For initial testing, the construction was equilibrated for 24 hours at 21° C./50% RH. For aged testing, the samples were placed in an oven at 50° C./65% RH for 14 days and then equilibrated for 24 hours at 21° C./50% RH.

The tape was then peeled from the coated film with a slip/peel tester set at a speed of 230 cm/min. in order to provide the initial release value. The peeled tape was then applied to a clean glass plate following which an additional peel test was performed in order to yield the initial readhesion value. Release and readhesion results are reported in Table 1.

Example 2

The latex contained the same formulation indicated in Example 1, but no sodium bicarbonate was added. The polymerization process indicated in Example 1 was followed. A stable latex was obtained. Release and readhesion results are reported in Table 1.

Example 3

The emulsifiers used in Example 1 (Siponate™ DS-10 and Igepal™ CA- 897) were replaced with 1.5% of the polymerizable anionic surfactant TREM LF- 40 (sodium alkyl allyl sulfosuccinate, from Henkel). The rest of the formulation and polymerization process were the same as in Example 1. A stable latex was obtained. Release and readhesion results are reported in Table 1.

Example 4

In a flask 77% deionized water, 12.5% Octadecyl acrylate monomer, 1.0% methyl acrylate monomer, 2.25% methyl methacrylate, 0.31% Siponate™ DS-10 surfactant (sodium dodecyl benzene sulfonate, available from Rhone-Poulenc), and 0.28% Igepal™ CA-897 surfactant (octylphenoxypoly(ethyleneoxy)ethanol, from Rhone-Poulenc) were heated to 50° C. under agitation. The mixture was homogenized in a Waring™ Blender for 3 minutes. The resulting emulsion was placed under nitrogen in a glass flask equipped with a thermometer, metering pump, mechanical stirrer, and reflux condenser. The mixture was heated to 60° C. and 0.087 parts potassium persulfate initiator was added. 30 minutes after reaching 60° C. the temperature was raised to 80° C. while a mixture of 0.52% methyl acrylate, 3.18% acrylonitrile, and 1.25% acrylic acid was pumped into the reactor over a forty minute period. The reaction mixture was kept at 80° C. with agitation for six hours. A stable latex was obtained. Release and readhesion results are reported in Table 1.

Example 5

The latex contained the same formulation as described in Example 1, with the exception that sodium bicarbonate was not added. The polymerization process was carried out according to the description in Example 1. However, the homogenization was carried out with a Manton-Gaulin™ homogenizer set at 5,000 psi, instead of a Waring™ blender. A stable latex was obtained and the release and readhesion results are reported in Table 1.

Comparative Example C6

In a flask 77% deionized water, 12.5% Octadecyl acrylate monomer, 4.35% methyl acrylate monomer, 0.31% Siponate™ DS-10 surfactant (sodium dodecyl benzene sulfonate, available from Rhone-Poulenc), 0.28% Igepal™ CA- 897 surfactant (octylphenoxypoly(ethyleneoxy)ethanol, from Rhone-Poulenc), 3.18% acrylonitrile, and 0.66% acrylic acid were heated to 50° C. under agitation. The mixture was homogenized with a Manton-Gaulin™ homogenizer set at 5,000 psi. The resulting emulsion was placed under nitrogen in a glass flask equipped with a thermometer, metering pump, mechanical stirrer, and reflux condenser. The mixture was heated to 80° C. and 0.087 parts potassium persulfate initiator was added. The reaction mixture was kept at 80° C. with agitation for six hours. A stable latex was obtained. In this example, a one step polymerization process was employed. The latex was then evaluated as indicated in Example 1. Release and readhesion results are reported in Table 1. It can be seen that the release coating transferred to the adhesive side and the readhesion of the adhesive was very low (59 g/cm as compared to the typical values greater than 400 g/cm).

Comparative Example C7

In a flask 81% deionized water, 14.8% Octadecyl acrylate monomer, 3.34% methyl acrylate monomer, 0.31% Siponate™ DS-10 surfactant (sodium dodecyl benzene sulfonate, available from Rhone-Poulenc), 0.28% Igepal™ CA- 0.897 surfactant (octylphenoxypoly(ethyleneoxy)ethanol, from Rhone-Poulenc), and 0.087% potassium persulfate initiator were heated to 60° C. under agitation. The reaction mixture was kept at 60° C. with agitation for four hours. Phase separation was observed and a coatable LAB was not obtained. In this example the polymerization mixture containing octadecyl acrylate was not homogenized.

TABLE 1

Release and Readhesion Values.

| Sample | Release Initial (g/cm) | Readhesion Initial (g/cm) | Release Aged[1] (g/cm) | Readhesion Aged[1] (g/cm) |
| --- | --- | --- | --- | --- |
| Example 1 | 89 | 468 | 134 | 335 |
| Example 2 | 67 | 468 | 111 | 424 |
| Example 3 | 89 | 468 | 111 | 446 |
| Example 4 | 89 | 468 | 106 | 370 |
| Example 5 | 94 | 437 | 111 | 357 |
| Example C6 | 140 | 59 | — | — |

[1]Aged at 50° C./65% RH for 14 days. No release data was recorded for Example C6 because of low initial readhesion values.

What is claimed:

1. A release coating comprising a waterborne latex polymer composition comprising:
   (a) latex particles having diameters less than 1 micrometer, wherein the latex particles are the polymerization reaction product comprising:
      (1) about 25 to about 75 weight percent of a first monomer, wherein the first monomer is at least one free-radically polymerizable long chain alkyl (meth)acrylate monomer having at least 12 to about 24 carbon atoms;
      (2) about 75 to about 25 weight percent of a second monomer, wherein the second monomer is a short alkyl chain (meth) acrylate monomer, wherein the alkyl group contains less than about 12 carbon atoms and such that the second monomer is a mixture comprising;
         i) 0 to about 15 weight percent of at least one (meth)acrylic acid monomer;
         ii) 0 to about 40 weight percent of at least one (meth)acrylic ester monomer; or
         iii) and combinations thereof, provided the second monomer comprises at least one of (meth)acrylic acid monomer and (meth)acrylic ester monomer, but not more than about 15 weight percent of (meth)acrylic acid monomers;
   (b) 0,5 to 8 weight percent of an emulsifier wherein the emulsifier is a nonionic, anionic, cationic, amphoteric emulsifier, a polymerizable surfactant or mixtures thereof;
   (c) water; and
   (d) optionally, one or more additives.

2. The release coating according to claim 1, wherein the optional one or more additives are selected from the group consisting of coalescing agents, rheology modifiers, pH modifiers, defoamers, and mixtures thereof.

3. The release coating according to claim 1, wherein the [C12 to C24] first monomer of the polymer latex composition is selected from the group consisting of octadecyl acrylate, stearyl acrylate, and behenyl acrylate.

4. The release coating according to claim 1, wherein the second monomer of the polymer latex composition further comprises about 0 to 30 weight percent of at least one vinyl nitrile monomer.

5. A process for making waterborne latex polymer compositions comprising the steps of:
   (a) admixing a first admixture, wherein the first admixture comprises (1) at least one long alkyl chain acrylate [(C12–C24)] monomer, wherein the long alkyl chain acrylate monomer has..12 to 24 carbon atoms, (2) water, and (3) an emulsifier, wherein the first admixture is water insoluble;
   (b) homogenizing the first admixture, wherein an emulsion is formed;
   (c) initiating free radical polymerization of the first admixture using a catalytically effective amount of an initiator; and
   (d) adding a second admixture of water soluble short alkyl chain monomers, wherein the alkyl group contains less than about 12 carbon atoms to the first admixture.

6. The process according to claim 5 wherein the first admixture further comprises at least one short alkyl chain monomer selected from the group consisting of alkyl esters of acrylic and methacrylic acid.

7. The process according to claim 5 wherein the alkyl esters of acrylic and methacrylic acid are selected from the group consisting of methyl acrylate, ethyl acrylate, isobornyl acrylate, hydroxyethyl acrylate, methyl methacrylate, ethyl methacrylate, vinyl acetate, vinyl propionate, and mixtures thereof.

8. The process according to claim 5 wherein the catalytically effective amount of initiator is added to the first admixture before homogenization of step (b).

9. The process according to claim 5 wherein the catalytically effective amount of initiator is added to the first admixture after homogenization of step (b).

10. The process according to claim 5 wherein the catalytically effective amount of initiator is added to the first admixture during homogenization of step (b).

11. An article comprising a substrate coated onto at least a portion of one side with the water-borne latex polymer composition according to claim 1.

12. An article comprising a substrate coated onto at least a portion of one side with the water-borne latex polymer composition prepared according to claim 5.

13. The release coating according to claim 1, wherein the second monomer of the polymer latex composition further comprises about 0 to 40 weight percent of at least one vinyl ester monomer.

* * * * *

UNITED STATES PATENT AND TRADEMARK OFFICE
CERTIFICATE OF CORRECTION

PATENT NO.: 5,516,865

DATED: May 14, 1996

INVENTOR(S): Urquiola

It is certified that error appears in the above-identified patent and that said Letters Patent is hereby corrected as shown below:

Col. 5, line 16, Insert a period after "thereof"

Col. 7, line 44, Delete "theology" and insert --rheology--

Col. 10, line 61, Delete "0.897" and insert 897--

Col. 11, line 42, Delete "0,5" and insert --0.5--

Col. 12, line 11, Delete "has.." and insert --has--

Signed and Sealed this

Thirty-first Day of December, 1996

Attest:

BRUCE LEHMAN

Attesting Officer

Commissioner of Patents and Trademarks